3,060,190
Patented Oct. 23, 1962

3,060,190
p-AMINOPHENOXYALKANES
Raymond Frederick Collins, Harold Wood, and Michael Davis, Upminster, England, assignors to May & Baker Limited, Dagenham, England, a British company
No Drawing. Filed Mar. 21, 1960, Ser. No. 16,119
Claims priority, application Great Britain Mar. 26, 1959
6 Claims. (Cl. 260—326)

This invention relates to new therapeutically useful p-aminophenoxyalkanes, to a process for their preparation and pharmaceutical compositions containing them.

According to the present invention, there are provided new p-aminophenoxyalkanes of the general formula:

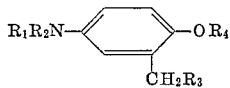

wherein $R_1$ and $R_2$ are the same or different and each represents a hydrogen atom or a lower alkyl or lower hydroxyalkyl group, $R_3$ represents a hydroxy, acetoxy, or lower hydroxyalkoxy group or a group —X—Y (wherein X is a sulphur atom or an SO or $SO_2$ group and Y is a lower alkyl, acylamidophenyl, benzyl or lower hydroxyalkyl group) and $R_4$ represents an alkyl, aralkyl or phthalimidoalkyl group, their acid addition salts and, where $R_1$ and $R_2$ are hydrogen atoms, their sodium formaldehyde bisulphite derivatives. Preferably the alkyl group or alkyl moiety of the aralkyl or phthalimidoalkyl group $R_4$ contains 5 to 9 carbon atoms. The word "lower" as used throughout this specification indicates that the group in question contains not more than 6 carbon atoms.

The aforesaid p-aminophenoxyalkanes of therapeutic value possess, in particular, antibilharzial activity. Preferred compounds are those in which $R_1$ and $R_2$ are hydrogen atoms and $R_4$ is an alkyl or phthalimidoalkyl group. Compounds of outstanding importance are 1-(4-amino-2-hydroxymethylphenoxy)-n-octane, 1 - (4-amino-2-ethylthiomethylphenoxy)-n-octane, 1-(4-amino-2-methylsulphonylmethylphenoxy)-n-octane, 1 - (2-p-acetamidophenylsulphonyl-4-aminophenoxy)-n-octane, 1-(4-amino-2 - hydroxymethylphenoxy) - 5 - phthalimidopentane and their acid addition salts.

According to a feature of the invention, the p-aminophenoxyalkanes of general Formula I are prepared by reducing a p-nitrophenoxyalkane of the general formula:

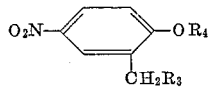

(wherein $R_3$ and $R_4$ are as hereinbefore defined) by known methods for reduction of a nitro group to amino and, if necessary, converting the primary amino group in the resultant product to a secondary or tertiary amino group $R_1R_2N$— (wherein $R_1$ is a hydrogen atom and $R_2$ is a lower alkyl or lower hydroxyalkyl group or $R_1$ and $R_2$ are lower alkyl or lower hydroxyalkyl groups) by known methods for alkylation or hydroxyalkylation of amines. By the term "known methods" as used in this specification is meant methods heretofore employed or described in the chemical literature.

Reduction of the nitro group may be effected, for example, by hydrogenation using Raney nickel or Adams' platinum as catalyst, or by heating with sodium sulphide solution. Alkylation of the resultant primary amino group may be effected by reaction with a reactive alkyl ester, the acid residue of which may be a halogen atom or a sulphuric or sulphonic grouping (e.g. methyl iodide or methyl toluene-p-sulphonate) in the presence of an acid binding agent, followed by pyrolysis when such reaction results in formation of a quaternary ammonium salt. Methylation of the primary amino group may also be carried out by employing formaldehyde and hydrogen in the presence of a catalyst, or formaldehyde and formic acid. Hydroxyalkylation of the primary amino group may be effected by reaction with, for example, a halogen hydrin (e.g. ethylene chlorohydrin). β-Hydroxyethyl groups may be introduced into the primary amino group by reaction with β-chloroethyl chloroformate followed by hydrolysis, rearrangement and decarboxylation.

The p-nitrophenoxyalkane starting materials of general Formula II in which $R_3$ is a hydroxy, acetoxy, lower alkoxy or lower hydroxyalkoxy group may be obtained by chloromethylating a compound of the formula:

(wherein $R_4$ is as hereinbefore defined) by reaction with paraformaldehyde and hydrogen chloride under anhydrous conditions in the presence of zinc chloride, and reacting the resultant compound of the general formula:

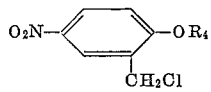

either as such or in the form of the corresponding iodomethyl derivative (obtained by reaction with sodium iodide) with a compound of the formula $MR_5$ (wherein $R_5$ represents an acetoxy, lower alkoxy or lower hydroxyalkoxy group and M represents an atom of hydrogen or of an alkali or alkaline earth metal) and, if desired when $R_5$ in the resultant product is acetoxy, converting the acetoxy group to hydroxy by hydrolysis with sodium or potassium hydroxide.

The p-nitrophenoxyalkane starting materials of general Formula II in which $R_3$ is a group —X—Y, X and Y being as hereinbefore defined, may be obtained by reacting a compound of Formula IV (or the corresponding iodomethyl derivative) with a compound of the formula MSY (wherein Y is as hereinbefore defined, and M is as hereinbefore defined or an atom of a heavy metal such as silver or lead) followed, where the starting material desired is one in which X is an SO or $SO_2$ group, by oxidation of the resultant sulphide of formula:

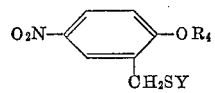

(wherein $R_4$ and Y are as hereinbefore defined) with, preferably, hydrogen peroxide in acetic acid or, alternatively, an oxidizing agent such as chromic acid or potassium permanganate.

The starting materials of general Formula II wherein $R_3$ is a grouping —S—Y, Y being a lower alkyl, benzyl or lower hydroxyalkyl group, may also be obtained by reacting a compound of Formula IV (or the corresponding iodomethyl derivative) with an alkali metal hydrosulphide, or with thiourea followed by hydrolysis, to produce a compound containing a free mercapto group, and converting the mercapto group to a lower alkylthio, benzylthio or lower hydroxyalkylthio group by alkylation, benzylation or hydroxyalkylation.

The starting materials of general Formula II in which $R_3$ is the group —$SO_2Y$, Y being as hereinbefore defined, may also be prepared by condensing a compound of the formula:

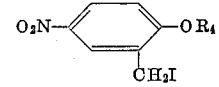

with an alkali or alkaline earth metal sulphinate of formula $QSO_2Y$ (wherein Q represents an atom of an alkali or alkaline earth metal, and Y is as hereinbefore defined).

The p-nitrophenoxyalkane starting materials of general Formula II may also be prepared by reacting a nitrophenol derivative of the general formula:

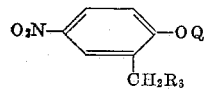

VII (wherein $R_3$ and Q are as hereinbefore defined) with an ester of the formula $ZR_4$ (wherein Z represents the residue of a reactive ester, such as a halogen atom or a methanesulphonate group, and $R_4$ is as hereinbefore defined). The nitrophenol derivatives of Formula VII are obtainable by conversion of the chloromethyl group in 2-chloromethylphenol into a grouping —$CH_2R_3$ by the methods hereinbefore described for conversion of the group in compounds of Formula IV to the grouping —$CH_2R_3$ and treatment of the resultant phenol in manner known per se to convert the —OH group into the group —OQ, e.g. with sodium ethoxide.

It will be obvious to those skilled in the art that many p-aminophenoxyalkanes of general Formula I can be converted to other compounds by the same general formula where $R_1$, $R_2$ and $R_3$ have different values. For example, compounds of general Formula I where $R_3$ is an acetoxy group can be converted to corresponding compounds where $R_3$ is a hydroxy group by hydrolysis, and compounds where $R_3$ is a sulphoxide group (—SO—) can be converted to compounds of general Formula I where $R_3$ is a sulphone group (—$SO_2$—) by oxidation.

For therapeutic purposes the bases of general Formula I may be employed as such or in the form of their acid addition salts, it being understood that only those such salts should in practice be employed as contain anions that are relatively innocuous to the animal organism when used in therapeutic doses so that the beneficial physiological properties inherent in the parent compound are not vitiated by side-effects ascribable to those anions; in other words, only non-toxic salts are contemplated. Suitable acid addition salts include hydrohalides, for example, hydrochlorides, phosphates, sulphates, methane sulphonates and isethionates. These salts may be made from the bases of general Formula I by the methods heretofore used in the art for making acid addition salts. For example, the acid salts may be made by mixing the required base with an equivalent quantity of a non-toxic acid in a solvent and isolating the resultant salt by filtration after, if necessary, evaporation of part or all of the solvent. They may be purified by crystallisation or by any method commonly used in the art. The bases of general Formula I where both $R_1$ and $R_2$ are hydrogen atoms may also be used for therapeutic purposes in the form of their sodium formaldehyde bisulphite derivatives. The bisulphite derivatives may be made by reacting the base with sodium formaldehyde bisulphite in water.

The following examples illustrate the invention:

*Example I*

1-p-nitrophenoxy-n-octane (226.5 g.) and paraformaldehyde (158 g.) were mixed with anhydrous zinc chloride powder (261 g.) in a flask fitted with a stirrer and calcium chloride guard tubes. The mixture was gassed with hydrogen chloride for 3 hours at 80° C. (bath temperature) and then it was stirred at 80° C. for a further 18 hours. The cold mixture was poured on to ice and extracted with ether. The ethereal extract was washed three times with water, sodium bicarbonate solution, water, and dried. The concentrate (260 g.) was 1-(2-chloromethyl-4-nitrophenoxy)-n-octane, M.P. 30–31° C., which solidified at room temperature. It was almost quantitatively converted to the corresponding 1-(2-iodomethyl-4-nitrophenoxy)-n-octane, M.P. 65–66° C., by refluxing with sodium iodide in acetone.

1 - (2 - chloromethyl - 4 - nitrophenoxy) - n - octane (35 g.) was refluxed with a solution of sodium methoxide [sodium (2.1 g.) was dissolved in dry methanol (60 ml.)] for 2 hours. The methanol was removed and the residue was taken up in ether, washed with water, dilute sodium hydroxide, water, dried and concentrated. The residue of 1-(2-methoxymethyl-4-nitrophenoxy)-n-octane (16.35 g.), B.P. 172–178° C./0.88 mm., was distilled. The foregoing nitro-compound (16.2 g.) was reduced catalytically in dimethylformamide over Raney nickel with hydrogen at just above atmospheric pressure to 1-(4-amino-2-methoxymethylphenoxy)-n-octane (7.8 g.), B.P. 158–160° C./0.06 mm.; hydrochloride, M.P. 65–67° C.

The following compounds were similarly prepared:

1-(2-chloromethyl-4-nitrophenoxy)-n-heptane, B.P. 170–175° C./0.1 mm.,

1 - (2 - methoxymethyl - 4 - nitrophenoxy)-n-heptane, B.P. 165–170° C./0.1 mm., and 1 - (4 - amino-2-methoxymethylphenoxy)-n-heptane, B.P. 147–151° C./0.1 mm., hydrochloride, M.P. 83–85° C.

*Example II*

1 - (2 - chloromethyl - 4 - nitrophenoxy) - n - heptane (52.36 g.) and potassium acetate (21.6 g.) in acetic acid (300 ml.) were refluxed for 7 hours. The mixture was filtered, concentrated and the residue taken up in ether, washed with water, sodium bicarbonate solution, water, dried and concentrated. The residue (free of halogen) of crude 1-(2-acetoxymethyl-4-nitrophenoxy)-n-heptane was reduced catalytically to 1-(2-acetoxymethyl-4-aminophenoxy)-n-heptane, which was dissolved in ethanol (150 ml.) and treated with sodium hydroxide (14.2 g.) dissolved in the minimum of water. After refluxing for 1 hour the solution was concentrated and the product taken up in ether, washed with water, dried and the solvent removed. The residue of 1-(4-amino-2-hydroxymethylphenoxy)-n-heptane (27.6 g.), B.P. 185–205° C./0.5 mm., M.P. 66–68° C., was distilled and crystallised from light petroleum (B.P. 40–60° C.).

*Example III*

1(2-iodomethyl-4-nitrophenoxy)-n-octane (10.0 g.) in acetic acid (30 ml.) was treated with potassium acetate (4.0 g.) and the mixture was refluxed for 1 hour. The solvent was removed and the residue was treated with water. The product was taken up in ether, washed with water, dried, and the ethereal solution was concentrated. The residue was recrystallised from light petroleum (B.P. 60–80° C.) giving pure 1-(2-acetoxymethyl-4-nitrophenoxy)-n-octane (6.7 g.), M.P. 33–34° C. This compound (2 g.) was added to a solution of potassium hydroxide (4 g.) in methanol (35 ml.). After 2 hours, the solution was diluted with water (100 ml.) and the crude product was collected, washed with water, recrystallised from aqueous methanol to give 1-(2-hydroxymethyl-4-nitrophenoxy)-n-octane (1.4 g.), M.P. 42–43° C. This compound (12.2 g.) was reduced catalytically in ethanol (200 ml.) over Raney nickel with hydrogen at 70 lbs./sq. in. to give 1-(4-amino-2-hydroxymethylphenoxy)-n-octane (7.7 g.), M.P. 69–71° C., B.P. 170–175° C./0.2 mm.

*Example IV*

2-chloromethyl-4-nitrophenol (30 g.) in methanol (150 ml.) was treated with a solution of sodium methoxide [sodium (3.7 g.) dissolved in methanol (100 ml.)] and the mixture was refluxed for ½ hour. A further quantity of sodium methoxide solution [sodium (3.7 g.) dissolved in methanol (100 ml.)] was added to form the sodium salt of 2-methoxymethyl-4-nitrophenol in situ. 5-phthalimidopentyl bromide (48.0 g.) was added to the mixture together with 2-ethoxyethanol (300 ml.). The methanol was removed by distillation (until the temperature of the vapour reached 130° C.) and the residual mixture was refluxed for 4 hours. It was then cooled and poured on to ice. The product soon solidified and was filtered off and recrystallised from ethanol. A second recrystallisation from light petroleum (B.P. 100–120° C.) gave the pure 1-(2-methoxymethyl-4-nitrophenoxy)-5-phthalimidopentane (34 g.), M.P. 93–95° C. The foregoing nitro compound was reduced catalytically in 2-ethoxyethanol over Raney nickel with hydrogen at 140 lbs./sq. in. at 60° C. to give the required 1-(4-amino-2-methoxymethylphenoxy)-5-phthalimidopentane (25.3 g.), M.P. 75–76° C.

In a similar manner but commencing with 2-hydroxymethyl-4-nitrophenol and 5-phthalimidopentyl bromide there were prepared 1-(2-hydroxymethyl-4-nitrophenoxy)-5-phthalimidopentane, M.P. 120–122° C. (from acetic acid), and 1-(4-amino-2-hydroxymethylphenoxy)-5-phthalimidopentane, M.P. 119–121° C. (from ethanol).

*Example V*

2-iodomethyl-4-nitrophenol (17.8 g.) in acetone (20 ml.) was treated with a solution (69 ml.) of sodium methanesulphinate (9.9 g.) in water. The mixture was refluxed for 3 hours, cooled, and the product was filtered off, washed with water and recrystallised from ethanol to give pure 2-methylsulphonylmethyl-4-nitrophenol (10.25 g.), M.P. 209–212° C. The foregoing product was suspended in 2-ethoxyethanol (20 ml.) and a solution of potassium hydroxide (3.4 g., 84% purity) in water (4 ml.) was added, followed by n-octyl bromide (8.9 ml.). The mixture was stirred and refluxed for 18 hours, cooled, and diluted with water and the crude product was filtered off and recrystallised from ethanol to give pure 1-(2-methylsulphonylmethyl-4-nitrophenoxy)-n-octane (11.7 g.), M.P. 90–93° C. This nitro compound (32.7 g.) was reduced by hydrogen at 70 lbs. per square inch in ethanol over a platinum oxide catalyst at 52° C. (maximum). The product was recrystallised from aqueous ethanol to give the required 1-(4-amino-2-methylsulphonylmethylphenoxy)-n-octane (23 g.), M.P. 97–98° C.

Similarly prepared were:

1-(2-methylsulphonylmethyl-4-nitrophenoxy)-n-heptane, M.P. 89–90° C., and
1-(4-amino-2-methylsulphonylmethylphenoxy)-n-heptane, M.P. 77–78° C.;
1-(2-methylsulphonylmethyl-4-nitrophenoxy)-n-hexane, M.P. 87–88° C., and
1-(4-amino-2-methylsulphonylmethylphenoxy)-n-hexane, M.P. 88–90° C.;
1-(2-methylsulphonylmethyl-4-nitrophenoxy-5-phthalimidopentane, M.P. 205–207° C., and
1-(4-amino-2-methylsulphonylmethylphenoxy)-5-phthalimidopentane, M.P. 109–111° C.

*Example VI*

1-(4-amino-2-methylsulphonylmethylphenoxy)-n-octane (18 g.) (prepared as described in the preceding example) was dissolved in ethanol (100 ml.) and treated with methyl iodide (21.8 ml.) and anhydrous sodium carbonate (6.1 g.). After refluxing for 2 hours the product was filtered off, washed with ethanol and recrystallised from water giving 1-(4-dimethylamino-2-methylsulphonylmethylphenoxy)-n-octane methiodide (21.6 g.), M.P. 180–182° C. (dec.). This compound was pyrolysed at 15 mm. pressure until no more methyl iodide was evolved. The residual oil was crystallised from ether/light petroleum (B.P. 40–60° C.) yielding pure 1-(4-dimethylamino-2-methylsulphonylmethylphenoxy)-n-octane (12.75 g.), M.P. 66–68° C.

*Example VII*

1-(2-methylthiomethyl-4-nitrophenoxy)-n-octane (11.6 g.) in acetic acid (100 ml.) was treated with hydrogen peroxide (4.2 ml. of 30% w./v.) and the mixture became warm. After ½ hour, water was added and the product was extracted into chloroform. The solution was washed with water, sodium bicarbonate solution, water and dried. The solvent was removed and the oil crystallised under a mixture of ether and light petroleum (B.P. 40–60° C.) to give 1-(2-methylsulphinylmethyl-4-nitrophenoxy)-n-octane (4.1 g.), M.P. 56–57° C. The foregoing nitro compound (1 g.) was hydrogenated in ethanol (10 ml.) at room temperature and atmospheric pressure over Raney nickel catalyst to the amine, which was isolated from the filtrate by the addition of water. Recrystallisation from aqueous ethanol gave pure 1-(4-amino-2-methylsulphinylmethylphenoxy)-n-octane (0.8 g.), M.P. 65–67° C.

*Example VIII*

1-(2-methylsulphinylmethyl-4-nitrophenoxy)-n-octane (1 g.) in acetic acid (15 ml.) was treated with hydrogen peroxide (0.5 ml. of 30% w./v.) and the solution was heated at 100° C. for 1 hour. The product crystallised out from the cooled solution and was collected and recrystallised from ethanol to give pure 1-(2-methylsulphonylmethyl-4-nitrophenoxy)-n-octane (0.8 g.), M.P. 90–91° C. identical with the sample prepared in Example V. Hydrogenation as described in Example V gave the required 1-(4-amino-2-methylsulphonylmethylphenoxy)-n-octane (0.6 g.), M.P. 95–97° C.

*Example IX*

1-(2-methylthiomethyl-4-nitrophenoxy)-n-octane (14.3 g.) in acetic acid (50 ml.) was treated with 30% w./v. hydrogen peroxide (11.5 ml.). The mixture became warm and complete solution was obtained. After 1 hour on the steambath the solution was cooled and the product crystallised out. It was collected, washed with acetic acid and recrystallised from ethanol to give pure 1-(2-methylsulphonylmethyl-4-nitrophenoxy)-n-octane (12.0 g.), M.P. 90–91° C. The nitro compound (11.7 g.) was reduced catalytically to 1-(4-amino-2-methylsulphonylmethylphenoxy)-n-octane (10.4 g.), M.P. 95–97° C. as in Example VIII.

Similarly prepared were:

1-[2-(2-hydroxyethylsulphonylmethyl)4-4-nitrophenoxy]-n-octane, M.P. 52–54° C., and
1-[4-amino-2-(2-hydroxyethylsulphonylmethyl)phenoxy]-n-octane, M.P. 75–77.5° C.;
1-(2-ethylsulphonylmethyl-4-nitrophenoxy)-n-octane, M.P. 92–93° C., and
1-(4-amino-2-ethylsulphonylmethylphenoxy)-n-octane, M.P. 74–76° C.

*Example X* p-Acetamidobenzenesulphinic acid (16 g.) in a solution of sodium acetate (6.6 g.) in water (100 ml.) was treated with a solution of 1-(2-iodomethyl-4-nitrophenoxy)-n-octane in acetone (300 ml.) and the mixture was refluxed for 2 hours. The mixture was poured onto ice and the crude product was filtered off and recrystallised from ethanol, to give 1-(2-p-acetamidophenylsulphonylmethyl-4-nitrophenoxy)-n-octane (26.0 g.), M.P. 157–159° C. Catalytic hydrogenation of the foregoing nitro compound (25.5 g.) in dimethylformamide (100 ml.) over Raney nickel catalyst gave the amine which was recrystallised from benzene to give pure 1-(2-p-acetamidophenylsulphonylmethyl-4-aminophenoxy)-n-octane (19.9 g.), M.P. 119–121° C.

Similarly prepared were:

1-(2-methylsulphonylmethyl-4-nitrophenoxy)-n-octane, M.P. 92–83° C., and
1-(4-amino-2-methylsulphonylmethylphenoxy)-n-octane, M.P. 97–98° C.

*Example XI*

1-(2-chloromethyl-4-nitrophenoxy)-n-octane (14.56 g.) was added rapidly to a solution of 2-mercaptoethanol (4.0 g.) and sodium ethoxide [sodium (1.2 g.) in ethanol (50 ml.)]. The mixture was refluxed for 30 minutes, concentrated, and the residue was taken up in ether, washed with dilute sodium hydroxide, water, dried and the solvent removed. The residual red oil was crystallised from a mixture of light petroleum (60–80° C.) and ether giving the required 1-[2-(2-hydroxyethylthiomethyl)-4-nitrophenoxy]-n-octane (11.6 g.), M.P. 41–42° C. This product was added slowly to a boiling solution of sodium sulphide nonahydrate (32.3 g.) in ethanol (33 ml.) at a rate just sufficient to maintain the reflux without external heat. The mixture was stirred and refluxed for 1½ hours, concentrated, taken up in ether, and washed with water. The ethereal solution was extracted with the theoretical quantity of dilute isethionic acid and the base recovered with sodium hydroxide and taken up in ethyl acetate, washed with water, dried and the solvent was removed. Light petroleum (40–60° C.) was added and 1-[4-amino-2 - (2 - hydroxyethylthiomethyl)-phenoxy]-n-octane (8.8 g.), M.P. 57.5–59° C., recrystallised out on cooling to −80° C.

*Example XII*

Crude 1-(2-chloromethyl-4 - nitrophenoxy) - n - octane (28 g., 83.2% by chlorine analysis) in ethanol (75 ml.) and thiourea (5.8 g.) were refluxed for 18 hours. To the partly cooled solution some ether was added and the S-(5-nitro - 2 - octlyoxybenzyl)thiuronium chloride (23.4 g.), M.P. 136–138° C., was filtered off after cooling the mixture to 0° C. This compound (2 g.) was refluxed with sodium bicarbonate (0.45 g.) in water (56.5 ml.) for 4½ hours under nitrogen. The cold mixture was extracted with ether and the ethereal solution was washed with water, dilute hydrochloric acid, water and dried. The solvent was removed and the residue solidified to give 1-(2-mercaptomethyl-4-nitrophenoxy)-n-octane, (1.4 g.), M.P. 32–33° C. The foregoing mercaptan (14.7 g.) was dissolved in a solution of sodium ethoxide [sodium (1.3 g.) dissolved in ethanol (50 ml.)] and treated with benzyl chloride (7 g.). The mixture was refluxed for 1 hour, concentrated and water was added to the residue. The product solidified after cooling to 0° C. and was recrystallised from ethanol to give pure 1-(2-benzylthiomethyl-4-nitrophenoxy)-n-octane (14.5 g.), M.P. 27–28° C. Reduction with sodium sulphide, as in Example XI, gave 1-(4-amino - 2 - benzylthiomethylphenoxy)-n-octane (8.1 g.), M.P. 40.5–41.5° C. from light petroleum (40–60° C.).

Similarly prepared were:

1-(2-methylthiomethyl - 4 - nitrophenoxy)-n-octane, M.P. 38–39° C., and

1 - (4-amino-2-methylthiomethylphenoxy)-n-octane, B.P. 165–167° C./0.03 mm., methanesulphonate, M.P. 81–84° C.;

1 - (2-ethylthiomethyl-4-nitrophenoxy)-n-octane (liquid) and 1-(4 - amino - 2 - ethylthiomethylphenoxy)-n-octane, B.P. 165–170° C./0.05 mm., methanesulphonate, M.P. 71–74° C.;

1-(4-nitro-2-propylthiomethylphenoxy)-n-octane (liquid) and 1-(4-amino - 2-propylthiomethylphenoxy)-n-octane, B.P. 180–190° C./0.5 mm., hydrochloride, M.P. 115–117° C.

*Example XIII*

2-chloromethyl-4-nitrophenol (18.75 g.) in ethanol (30 ml.) was warmed and treated dropwise over 1 hour with a solution of 2-mercaptoethanol (7.8 g.) in an ethanolic solution of sodium ethoxide [sodium (2.3 g.) in ethanol (50 ml.)]. After ½ hour, the mixture was concentrated and water was added to the residue. The water was decanted from the oil. The oil was extracted with warm 1 N sodium hydroxide solution. The yellow solution was acidified with concentrated hydrochloric acid and the product extracted into ether, washed with water, dried and concentrated. The residue crystallised under light petroleum (40–60° C.) and was recrystallised from benzene and a small quantity of ethanol to give pure 2-(2-hydroxyethylthiomethyl)-4-nitrophenol (3.2 g.), M.P. 95–98° C.

The foregoing phenol (10 g. crude material) was dissolved in an ethanolic solution of sodium ethoxide [sodium (1.0 g.) in ethanol (25 ml.)] and n-octyl bromide (9.3 g.) was added. After refluxing for 24 hours, the solvent was removed and the product was taken up in ether, washed with water, dilute sodium hydroxide, water, dried and concentrated. The residue was extracted with light petroleum (40–60° C.) and yielded 1-[2-(2-hydroxyethylthiomethyl) - 4-nitrophenoxy]-n-octane (2.3 g.), M.P. 41–42° C. identical with the sample prepared in Example XI. This nitro compound was reduced with sodium sulphide as described in Example XI to give 1-[4-amino - 2 - (2-hydroxyethylthiomethyl)-phenoxy]-n-octane, M.P. 57.5–59° C., identical with the product prepared in Example XI.

*Example XIV*

Sodium (3.7 g.) was dissolved in dry methanol (350 ml.) and methylmercaptan was bubbled into the cold solution until the formation of sodium methylmercaptide was complete. This solution was slowly added to a stirred suspension of 1-(2-chloromethyl-4-nitrophenoxy)-n-octane (48 g.) in methanol (200 ml.) and the mixture was stirred for 24 hours. Some acetic acid was added to the mixture which was then concentrated. The product was taken up in ether, washed with water, 2 N sodium hydroxide solution, water, dried and the solvent was removed. The residue crystallised out from light petroleum (B.P. 40–60° C.) at −80° C. to give pure 1-(2-methylthiomethyl-4-nitrophenoxy)-n-octane (36 g.), M.P. 35–36° C., not depressed on admixture with the corresponding product of Example XII. Reduction and formation of a salt as before gave 1-(4-amino-2-methylthiomethylphenoxy)-n-octane methanesulphonate, M.P. 81–84° C.

Oxidation of the 1-(2-methylthiomethyl-4-nitrophenoxy)-n-octane with hydrogen peroxide in acetic acid as in Example IX gave 1-(2-methylsulphonylmethyl-4-nitrophenoxy)-n-octane, M.P. 91–93° C., and this was reduced as before to 1-(4-amino-2 - methylsulphonylmethylphenoxy)-n-octane, M.P. 97–98° C.

The present invention further includes within its scope pharmaceutical compositions which comprise one or more compounds of general Formula I, or their acid addition salts as aforesaid or, in the case of primary amines, their sodium formaldehyde bisulphite derivatives, together with a significant amount of a pharmaceutical carrier which may be either a solid material or a liquid. The invention includes especially such compositions made up for oral or parenteral administration. In clinical practice the compounds of the present invention will normally be administered orally so that compositions suitable for oral administration, e.g. tablets, capsules or suspensions, are preferred.

Solid compositions for oral administration include compressed tablets, pills, dispersible powders, and granules. In such solid compositions one or more of the active compounds of general Formula I or their acid addition salts or derivatives as aforesaid is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention, for oral administration, also include capsules of absorbable material such as gelatin containing one or more of the active substances with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage shall be obtained. Obviously several unit dosage forms may be administered at about the same time. In general, the preparations of the present invention should normally contain at least 1% by weight of active substance in the case of injectable solutions and at least 5% by weight, usually 70–75% by weight, of such substance in the case of oral preparations.

The following example illustrates pharmaceutical compositions according to the invention.

*Example XV*

Tablets were prepared of the formula:

| | Percent |
|---|---|
| 1 - ( 4 -amino-2-methylsulphonylmethylphenoxy)-n-octane | 78.4 |
| Sodium carboxymethylcellulose | 0.88 |
| Starch | 14.2 |
| Dextrin | 5.5 |
| Magnesium stearate | 0.44 |
| Stearic acid | 0.6 | the percentages being by weight.

There may be prepared similarly pharmaceutical compositions in the form of tablets in which the 1-(4-amino-2-methylsulphonylmethylphenoxy)-n-octane of Example XV is replaced by a like quantity of any of the other products (or their crystalline salts) described in Examples I to XIV.

We claim:

1. A p-aminophenoxyalkane of the formula:

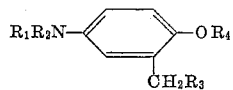

wherein $R_1$ and $R_2$ are members of the class consisting of hydrogen, methyl, ethyl and hydroxyethyl, $R_3$ represents a member of the class consisting of hydroxy, lower alkoxy and lower hydroxyalkyl of which the alkyl moiety contains up to 6 carbon atoms, and a group —X—Y, in which X is selected from S, SO and $SO_2$ and Y is a member of the class consisting of methyl, ethyl, acetamidophenyl, benzyl and hydroxyethyl, and $R_4$ is a member of the class consisting of alkyl containing 5 to 9 carbon atoms, phenylalkyl and phthalimidoalkyl of 5 to 9 carbon atoms in the alkyl moiety, and its acid addition salts of which the anions are therapeutically acceptable and, where $R_1$ and $R_2$ are hydrogen atoms, its sodium formaldehyde bisulphite derivative.

2. The compound 1 - (4-amino-2-hydroxymethylphenoxy)-n-octane.

3. The compound 1 - (4 - amino-2-ethylthiomethylphenoxy)-n-octane.

4. The compound 1 - (4 - amino-2-methylsulphonylmethylphenoxy)-n-octane.

5. The compound 1-(2-p-acetamidophenylsulphonyl-4-aminophenoxy)-n-octane.

6. The compound 1 - (4 - amino-2-hydroxymethylphenoxy)-5-phthalimidopentane.

References Cited in the file of this patent

UNITED STATES PATENTS

| 2,278,996 | Klein | Apr. 7, 1942 |
| 2,830,008 | Barber et al. | Apr. 8, 1958 |
| 2,927,132 | Barber et al. | Mar. 1, 1960 |

OTHER REFERENCES

Collins et al.: British Journal of Pharm., vol. 13, pages 238–43 (1958).